United States Patent [19]
Fowler et al.

[11] Patent Number: 4,918,990
[45] Date of Patent: Apr. 24, 1990

[54] ULTRASONIC TRANSDUCER ASSEMBLY

[75] Inventors: Kenneth A. Fowler; Dana R. Patch, both of Medfield; Frederick H. Hotchkiss, Harvard, all of Mass.

[73] Assignee: Panametrics, Inc., Waltham, Mass.

[21] Appl. No.: 350,218

[22] Filed: May 8, 1989

Related U.S. Application Data

[63] Continuation of Ser. No. 19,003, Feb. 26, 1987.

[51] Int. Cl.$^5$ .............................................. B23K 11/30
[52] U.S. Cl. ..................................... 73/629; 219/119; 73/632; 310/336
[58] Field of Search .................. 73/620, 629, 632; 219/119, 120; 310/336

[56] References Cited

U.S. PATENT DOCUMENTS

| | | | |
|---|---|---|---|
| 3,393,331 | 7/1968 | Puckett | 310/336 |
| 3,781,576 | 12/1973 | Runde et al. | 310/336 |
| 4,162,111 | 7/1979 | Brown | 310/336 |
| 4,472,620 | 9/1984 | Nied | 219/109 |
| 4,701,658 | 10/1987 | Ringermacher et al. | 310/327 |

FOREIGN PATENT DOCUMENTS

| | | | |
|---|---|---|---|
| 690489 | 4/1953 | United Kingdom | 310/336 |
| 1121523 | 7/1968 | United Kingdom | 73/632 |

*Primary Examiner*—John Chapman
*Assistant Examiner*—Lawrence Fess
*Attorney, Agent, or Firm*—Lahive & Cockfield

[57] ABSTRACT

An ultrasonic transducer assembly for monitoring the quality of spot welds employs a transducer element joined to a support element and fitted within a conventional welding electrode assembly. The transducer assembly is biased against the interior surface of the welding electrode tip by a biasing element, preferably a compression spring. A sleeve, preferably composed of brass, surrounds the transducer element and is joined to the support element. A coaxial cable in communication with external instrumentation has a ground lead attached to the sleeve, and a signal lead attached to the transducer element.

10 Claims, 1 Drawing Sheet

ULTRASONIC TRANSDUCER ASSEMBLY

This is a continuation of application Ser. No. 019,003, filed Feb. 26, 1987.

BACKGROUND OF THE INVENTION

This invention relates in general to ultrasonic transducers such as those used for process monitoring, and in particular, provides an ultrasonic transducer assembly for monitoring the quality of spot welds during the welding process.

There exist many industrial manufacturing processes in which accurate monitoring and control of spot weld quality are critical to the structural integrity of the assembly. In the automobile industry, for example, it has been long been recognized that a means of monitoring the quality of spot welds would be of great value.

Prior art systems for monitoring weld quality have attempted to monitor weld quality, while the weld was being created, by passing ultrasonic waves through the welding electrodes and the forming weld by the through-transmission technique. More recently, there have been additional efforts to utilize acoustic emission techniques to monitor weld quality and to control the welding process Pulse-echo ultrasonic techniques are presently being utilized to evaluate weld quality after the weld is created, but these techniques have associated deficiencies in evaluating weld thickness due to variable weld geometry and interpretation.

Recently, there have been attempts to construct an ultrasonic transducer for monitoring spot weld quality that can be fitted into a commonly used spot weld electrode. In one prior art approach, a ring transducer is fitted on the inside shoulder of a weld electrode. This design yields a poor signal due to interaction of the ultrasound energy with the walls of the electrode. Additionally, this design fails to concentrate ultrasound energy on the centerline of the electrode where the weld nugget forms.

A second prior art approach to utilizing ultrasound for monitoring spot weld quality involves bonding a miniature transducer assembly to the inside surface of the electrode. This technique yielded good ultrasonic signal characteristics. However, apparatus constructed in accordance with this prior art approach has a useful life of only approximately 60 weld cycles.

There are two reasons for the premature failure of devices constructed according to this latter prior art approach. First, spot welding electrodes are commonly constructed of pure copper. This material is exceedingly difficult to prepare properly for bonding, due to the rapid formation of thin, loosely adherent oxide layers on the surface of the copper. Secondly, as welds are generated, the weld electrode heats up. Although weld electrodes are generally water cooled, it is estimated that the inside surface to which an ultrasonic transducer is bonded can reach 400 to 600 degrees Fahrenheit. Heating to this temperature range greatly reduces bond reliability even under otherwise ideal circumstances. The bonding problem is exacerbated, however, by cyclical heating and cooling of the weld electrode.

Moreover, when high temperature epoxy is used to bond the transducer assembly to the electrode, and as potting material to hold electrical leads in place, the epoxy tends to thermally insulate the surface of the electrode that most needs to be cooled in order to prevent disbonding.

Presently, there exists no generally acceptable way of monitoring weld quality and of controlling the welding process based on monitoring information. It is thus a general practice of industry to make many more welds than are theoretically required in order to ensure the required mechanical strength in the finished assembly. Further, even when utilizing this redundant weld approach, there is no absolute assurance that projected structural integrity has been achieved in the final assembly. Thus, there exists a need for a method and apparatus for monitoring spot weld quality while the weld is being made.

It is accordingly an object of the invention to provide an ultrasonic transducer for monitoring spot weld quality which can be fitted into a commonly used spot weld electrode and which will reliably survive the environment of the electrode without degradation.

Another object of the invention is to provide an ultrasonic transducer having a minimum useful life of approximately 10,000 weld cycles.

It is a further object of the invention to provide an ultrasonic transducer which exhibits good ultrasonic signal characteristics with high signal to noise ratio, and which has minimum effect on the efficiency of water cooling of the weld electrode.

Further objects of the invention are to provide an ultrasonic transducer which is removable from the electrode, because electrode life is normally in the range of 3,000 to 5,000 weld cycles; to provide a transducer assembly which is retained to the weld electrode shank while electrode tips are being replaced; and to provide a transducer assembly which is easily removed and exchanged if damaged.

SUMMARY OF THE INVENTION

The invention discloses an ultrasonic transducer assembly that can be fitted inside a welding electrode structure which commonly includes a welding electrode tip and an electrode shank. The invention features a transducer element situated inside the electrode tip for generating, transmitting, and receiving ultrasonic waves, and a biasing element, interposed between the transducer element and the shank, for biasing the transducer element into close contact with the electrode tip so that the transducer element is acoustically coupled to the electrode tip.

The invention further discloses an ultrasonic transducer assembly for use inside a welding electrode structure, wherein the transducer assembly includes a support element joined to the front surface of the transducer element and biased into contact with the interior surface of the electrode tip.

In a preferred embodiment of the invention, the bias element is a compression spring which bears against the electrode shank at one end, and against a flange in the support element at the other end.

The invention further features a viscous fluid couplant introduced between the support element and the electrode, for acoustically coupling the transducer element and the electrode tip. The fluid medium is tolerant of thermal expansions that occur in the transducer/electrode assembly.

In further preferred embodiments of the invention, a brass support element with a flange acts as the mounting surface to which the transducer element is soldered. The invention further features a brass sleeve surrounding the transducer element and soldered to the support element. The sleeve acts as an attachment point for a ground lead, and forms a reservoir for potting material. The potting compound retains a coaxial cable that leads to external instrumentation and, for example, a robotic process controller.

The invention also discloses a separator element placed between the transducer element and the potting material. The separator element serves to isolate the transducer element from mechanical stresses due to curing and thermal expansion of the potting material.

The invention will next be described in connection with certain illustrated embodiments. However, it should clear that various changes, modifications, and additions can be made by those skilled in the art without departing from the spirit or scope of the invention as defined in the claims.

BRIEF DESCRIPTION OF THE DRAWINGS

Other objects, features and advantages of the invention will be apparent to those practiced in the art from the following description taken together with the drawings, in which.

Throughout the drawing figures, like reference numerals are used to indicate corresponding parts.

DESCRIPTION OF ILLUSTRATED EMBODIMENTS

Figure 1:
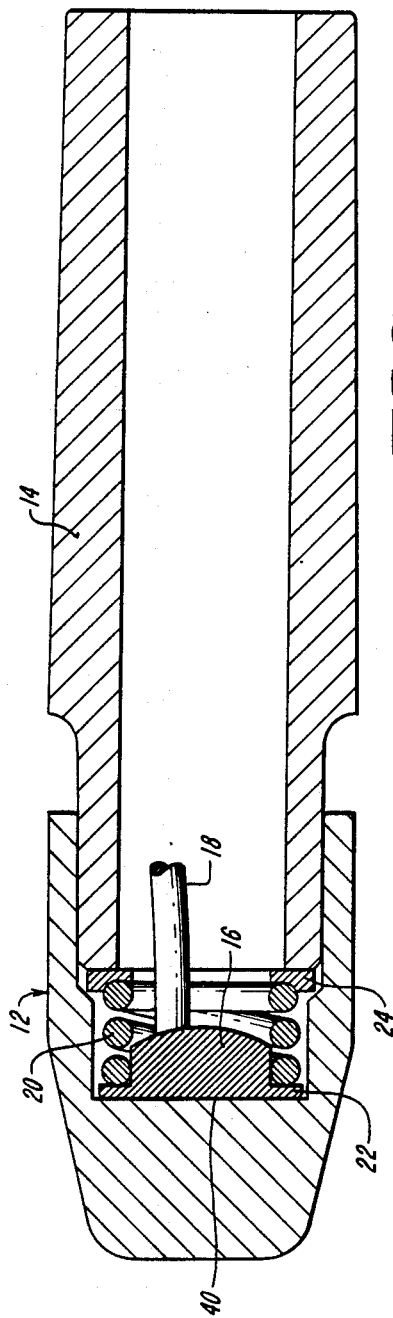
FIG. 1 is a sectional view of the assembled electrode transducer assembly according to the invention.

As shown in FIG. 1, a transducer assembly according to the invention, indicated generally by reference numeral 16, is fitted into electrode tip 12. Electrode tip 12 is retained in shank 14 by a friction fit. Both electrode tip 12 and shank 14 are commonly used components of an electrode assembly well known in the art.

FIG. 1 shows spring 20, which seats at its shank end against seat 24, and which seats at its electrode tip end against flange 22. Spring 20 thereby biases transducer assembly 16 into close contact with the interior surface of electrode tip 12. Coaxial cable 18, which leads from the rear of transducer assembly 16, passes through shank 14 to external monitoring instrumentation.

In a preferred embodiment of the invention, a fluid couplant 40, such as a high temperature silicon grease, is introduced between transducer assembly 16 and the interior surface of electrode tip 12. Acoustic coupling between the transducer assembly 16 and electrode 12 is thus made by the fluid couplant 40, which is tolerant to small thermal expansions that occur in the transducer 16 and electrode tip 12.

To assemble the transducer assembly 16 into an electrode 12, the end of the transducer assembly 16 is covered with the fluid couplant 40 and inserted into electrode tip 12. Electrode tip 12 is then pressed onto shank 14. Electrode tip 12 is then held in place by the friction fit between electrode tip 12 and shank 14. Compression spring 20 exerts sufficient force to eliminate excess couplant 40 and sufficient force to hold transducer assembly 16 in close contact with the machined interior surface of electrode tip 12.

Figure 2:
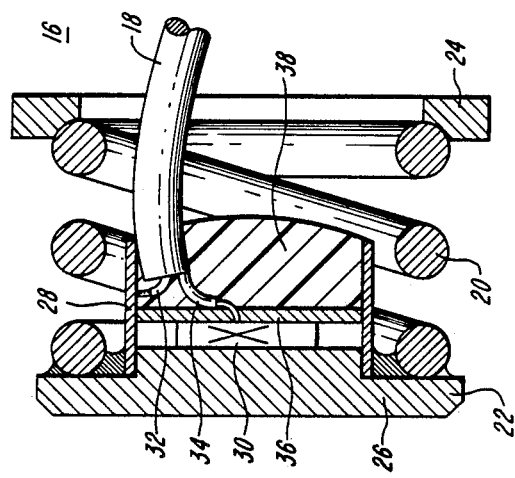
FIG. 2 is a sectional view of the transducer assembly, giving detail of the transducer element and support element construction.

FIG. 2 is a sectional view of the transducer assembly 16 giving detail of the transducer assembly construction. The front surface element 30 is joined to the rear surface of support element 26. In a preferred embodiment of the invention, support element 26 is composed of brass and transducer element 30 is joined to support element 26 by solder. This soldering of transducer element 30 to support element 26 ensures stability of the bond over the expected temperature range, i.e., 400 to 600 degrees Fahrenheit. Solder based bonding of transducer element 30 to support element 26 thereby eliminates one of the significant deficiencies of the prior art approach.

In a preferred embodiment of the invention, support element 26 is biased against the interior surface of electrode tip 12 by a compression spring 20. Compression spring 20 bears at its shank end against spring seat 24, and at its electrode tip end against a peripheral flange 22 on support element 26.

A sleeve 28, preferably composed of brass, is joined to support element 26 and surrounds transducer element 30. Sleeve 28 is preferably soldered to support element 26 and transducer element 30 for mechanical stability.

Coaxial cable 18, containing a ground lead 32 and a signal lead 34, passes through shank 14 to sleeve 28. Ground lead 32 is attached to sleeve 28. Support element 26, to which sleeve 28 is soldered, acts as instrument ground. Signal lead 34 is preferably soldered to surface of transducer element 30. Thus, electrical signals transmitted along coaxial cable 18 are converted into ultrasonic waves by transducer element 30 and ultrasonic waves reflected by the weld are received by transducer element 30 and converted into electrical signals which are transmitted along coaxial cable 18 to external instrumentation.

In a preferred embodiment, sleeve 28 extends past transducer element 30, to form a reservoir for potting compound 38. Potting compound 38 is introduced into the reservoir formed by sleeve 28 and is allowed to cure around coaxial cable 18 and leads 32 and 34. Potting compound 38 thus acts to retain leads 32 and 34 and cable 18 to transducer element 30.

In a further preferred embodiment of the invention, separator element 36 is interposed between transducer element 30 and potting material 38. The separator element 36 thereby serves to isolate transducer element 30 from mechanical stresses arising from the curing and thermal expansion of the potting compound 38.

It will thus be seen that the invention efficiently attains the objects set forth above. Additions, subtractions, deletions and other modifications of the disclosed illustrated embodiments will be within the skill of one practiced in the art and are within the scope of the following claims.

Having described the invention, what is claimed as new and secured by Letters Patent is:

1. An ultrasonic transducer assembly for use within a welding electrode structure, wherein said welding electrode structure can be disassembled and includes a welding electrode tip detachably fitted to a shank, the electrode tip having a front surface adapted for welding a workpiece and a rear surface distal from the front surface, the ultrasonic transducer assembly comprising:

A. transducer means, including a transducer element, detachably positionable inside the electrode tip, between the shank and the rear surface of the electrode tip, and having a front surface, for generating, transmitting and receiving ultrasonic waves, said transducer means further including a rigid support element having front and rear surfaces and a peripheral flange, said rear surface of said support element being joined to said front surface of said transducer element, and said front surface of said support element being adapted for detachably contacting the rear surface of the electrode tip, so that said transducer means can be detachably coupled to the rear surface of the electrode tip, and B. biasing means, interposed between said transducer means and the shank, for generating a biasing force between the shank and the electrode tip and biasing said front surface of said transducer means into contact with the rear surface of the electrode tip, so that said transducer means is acoustically and detachably coupled to the rear surface of the electrode tip, said biasing means including a compression spring for generating said biasing force, said compression spring being located between the shank and the support element flange, said compression spring having first and second ends, said first end bearing against said flange, and said second end bearing against the shank, so that said biasing force is transmitted from the shank to said flange, and said transducer element is isolated from said biasing force.

2. A transducer assembly according to claim 1, further comprising viscous fluid interposed between said support element and said electrode tip, for acoustically coupling said support element and said electrode tip.

3. A transducer assembly according to claim 2, wherein said viscous fluid is composed of high temperature grease.

4. A transducer assembly according to claim 3, further comprising a tubular sleeve joined to said rear surface of said support element and surrounding said transducer element.

5. A transducer assembly according to claim 4, wherein said support element and sleeve are composed of brass.

6. A transducer assembly according to claim 5, wherein said support element, transducer element and sleeve are joined by metal films.

7. A transducer assembly according to claim 6, wherein said metal films are a solder.

8. A transducer assembly according to claim 7, further comprising

A. coaxial cable extending from said rear surface of said transducer means, said coaxial cable including a ground lead in electrical communication with said sleeve, and a signal lead in electrical communication with said transducer element, and B. potting material affixed to said rear surface of said transducer means, for retaining said coaxial cable to said transducer means.

9. A transducer assembly according to claim 8, wherein said potting material is composed of epoxy.

10. A transducer assembly according to claim 9, further comprising a separator element interposed between said rear surface of said transducer element and said potting material, for separating said transducer element from said potting material and isolating said transducer element from mechanical stresses arising from curing and thermal expansion of said potting material.

* * * * *